United States Patent [19]

Shin

[11] Patent Number: 5,732,913
[45] Date of Patent: Mar. 31, 1998

[54] APPARATUS FOR LEVELLING A REFRIGERATOR

[75] Inventor: Jun-Chul Shin, Incheon, Rep. of Korea

[73] Assignee: Daewoo Electronics Co., Ltd., Seoul, Rep. of Korea

[21] Appl. No.: 738,456

[22] Filed: Oct. 30, 1996

[30] Foreign Application Priority Data

Oct. 31, 1995 [KR] Rep. of Korea ............. 95-39089

[51] Int. Cl.⁶ .................................................. F16M 11/24
[52] U.S. Cl. .......................................................... 248/188.2
[58] Field of Search ......................... 248/188.2; 16/29, 16/32, 33; 73/432.1, 865.9, 862.541

[56] References Cited

U.S. PATENT DOCUMENTS

| | | | |
|---|---|---|---|
| Re. 21,194 | 9/1939 | Blanchett | 248/188.2 X |
| 2,828,578 | 4/1958 | McCabe | 16/19 X |
| 3,186,670 | 6/1965 | Perl | 248/188.2 |
| 3,432,878 | 3/1969 | Hupfer | 16/32 |
| 3,534,430 | 10/1970 | Kesling et al. | 16/19 X |
| 4,368,869 | 1/1983 | Gelvezon et al. | 248/188.2 X |
| 4,459,813 | 7/1984 | Petta | |
| 4,518,142 | 5/1985 | Sulcek et al. | 248/188.2 X |
| 4,763,868 | 8/1988 | Teich | 248/188.2 X |
| 4,789,121 | 12/1988 | Gidseg et al. | 248/188.2 |
| 5,310,146 | 5/1994 | Maguire | 248/18.2 |
| 5,398,620 | 3/1995 | Rouch | 248/188.2 X |

*Primary Examiner*—Elizabeth L. Dougherty
*Attorney, Agent, or Firm*—Beveridge, DeGrandi, Weilacher & Young LLP

[57] ABSTRACT

An apparatus for determining whether a refrigerator is level and levelling the refrigerator if it is not level. The apparatus comprises a determining sections which determines whether the refrigerator is level, and four levelling sections each of which levels the refrigerator if it is not level. The determining section include a housing, upper and lower terminals, and a connecting member which connects the upper and lower terminals. One or two of four motors are operated if the upper and lower terminals corresponding to the motors are electrically connected to each other, and the levelling sections corresponding to the motors levels the refrigerator. The structure of the apparatus is simple. Further, the apparatus can easily levels the refrigerator, thereby preventing a safety accident during the levelling work.

6 Claims, 3 Drawing Sheets

5,732,913

APPARATUS FOR LEVELLING A REFRIGERATOR

BACKGROUND OF THE INVENTION

1. Field of the Invention

The present invention relates to an apparatus for levelling a refrigerator, and more particularly to an apparatus which determines whether a refrigerator is tilted and which levels the refrigerator if it is tilted.

2. Description of the Prior Art

A refrigerator includes a cabinet which forms compartments for storing food at a low temperature. There are generally two types of compartments in a refrigerator, a refrigerating compartment for storing foods at a low temperature and a freezer compartment for freezing foods. Shelves are installed in the refrigerating compartment to place foods thereon.

However, if a surface on which the refrigerator is positioned is not level, the refrigerator becomes tilted. Then, the foods on the shelves of a refrigerator may be moved from one place to another place, and vibration and noise may be generated during the operation of the refrigerator. The vibration of a refrigerator can cause an abnormal operation thereof, and also can cause it to become out of order.

Therefore, there is a need to level a refrigerator in accordance with various different supporting surfaces on which the refrigerator is positioned. A refrigerator is generally provided with a levelling apparatus to level it. Further, wheels such as those disclosed in U.S. Pat. No. 3,858,270 issued to Crowe on Jan. 7, 1975 are generally provided at the bottom of a cabinet of a refrigerator at its rear portions so that the refrigerator can be easily moved. The levelling apparatus is mounted on the bottom surface of the cabinet, and includes a frame which is attached to the bottom surface of the cabinet, and legs which are rotatably mounted on the frame. Tapped holes through each of the legs are threaded, are formed on the frame, and supporting members which make contact with the supporting surface, are respectively fixed to the lower end of the legs. Each of the supporting members has a cylindrical shape. The diameter of each of the supporting members is larger than that of each of the legs, so that the load of the refrigerator is distributed to all supporting areas of the supporting members to prevent the supporting surface from caving in.

If the supporting surface is not level, the refrigerator becomes tilted. In order to level the refrigerator, the legs are rotated in either a clockwise or counterclockwise direction so that the lengths of the legs are regulated. By regulating the lengths of the legs, the refrigerator is levelled. Therefore, the distance of each side of the cabinet bottom surface from the supporting surface, and the lengths of each of the legs, can be different from one another.

According to the levelling apparatus, a user determines whether the refrigerator is level by shaking it or by looking at it. Then, the refrigerator can be leveled by lifting one side of the refrigerator manually and regulating the length of one of the legs.

Nevertheless, a refrigerator is so heavy that it is not easy to level the refrigerator by hand and a person can be injured during the levelling work. Further, it is difficult to determine whether the refrigerator has been levelled accurately.

SUMMARY OF THE INVENTION

Accordingly, it is an object of the present invention to provide an apparatus which determines whether a refrigerator is level, and determines which direction it is leaning towards if the refrigerator is not level, and then levels the refrigerator.

To achieve the object, the present invention provides a levelling apparatus comprising:

a determining section for determining whether a refrigerator is level and, and for determining which direction it is leaning towards if it is not level, the determining means being mounted on an upper surface of a base plate of a refrigerator;

four motors respectively mounted on corners of the base plate and connected to the determining means, for generating a driving force; and four levelling sections each of which is mounted on the corners of the base plate and is driven by each of the motors.

The determining section comprises a housing, a plurality of upper terminals fixed to the housing, the plurality of lower terminals respectively corresponding to the upper terminals, and a connecting member for selectively connecting one of the upper terminals to one of the lower terminals corresponding to the upper terminal, or for connecting two of the upper terminals to two of the lower terminals corresponding to the upper terminals, when the refrigerator is not level.

Each of the levelling sections comprises an adjustable shaft which is rotated by a driving force of the motor and levels the refrigerator, and a supporting member which supports the refrigerator and into which the adjustable shaft is inserted.

The upper and lower terminals are electrically connected to each other, and then the motor corresponding to the terminals is operated by the connection. The adjustable shaft is rotated by the motor, levelling the refrigerator.

The levelling apparatus according to the present invention has advantages in that it is quite simple in structure and easy to manufacture, and it can easily levels a refrigerator, and thus preventing a safety accident during the levelling work.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENT

Hereinafter, a preferred embodiment of the present invention will be described in detail with reference to the accompanying drawings.

Figure 1:
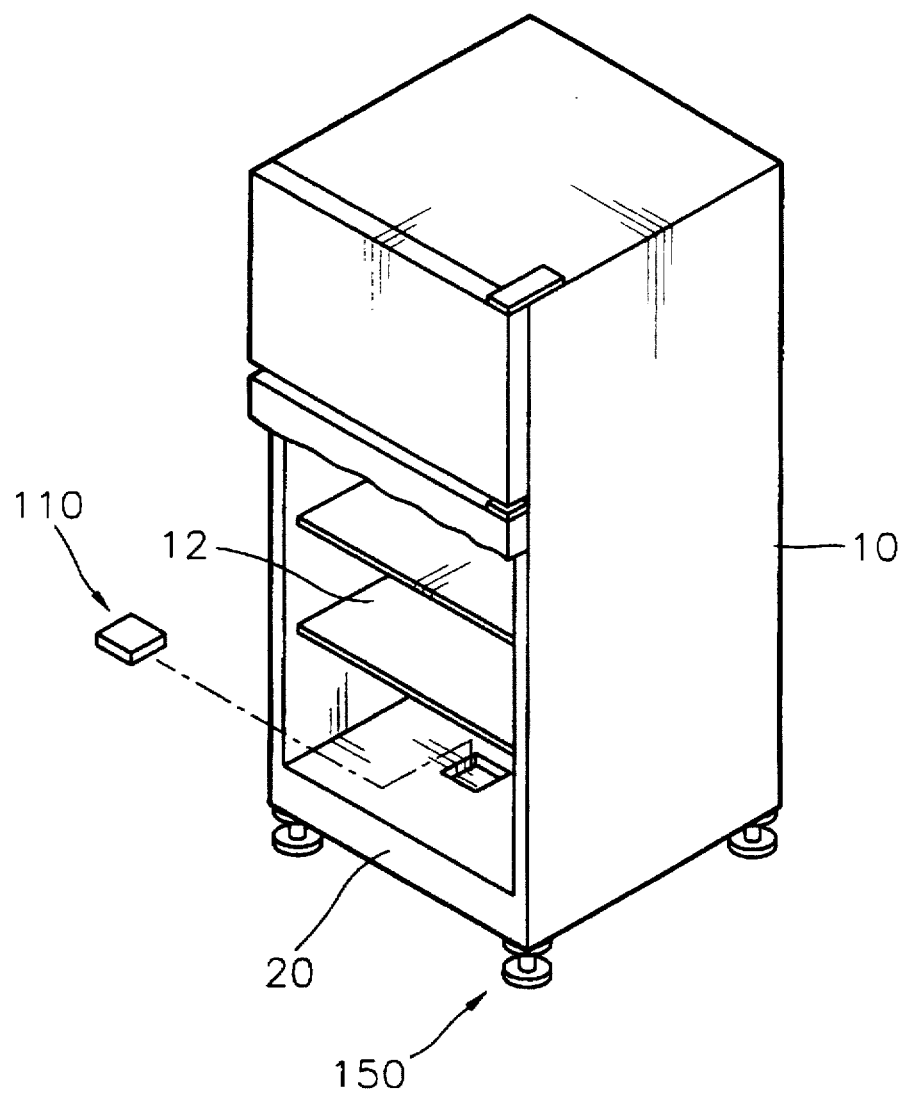
FIG. 1 is a perspective view for showing an installed state of a levelling apparatus in the refrigerator according to the present invention.
Figure 2:
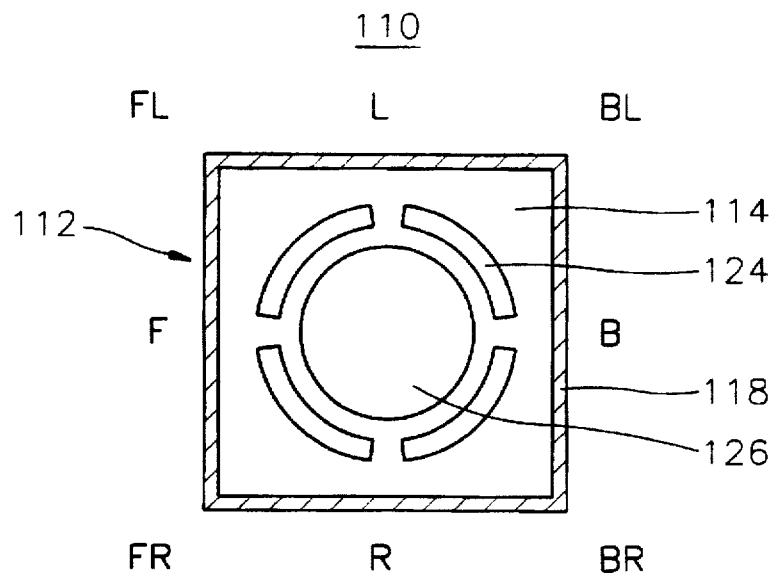
FIG. 2 is a cross sectional view for showing a level determining section of the levelling apparatus of FIG. 1.
Figure 3:
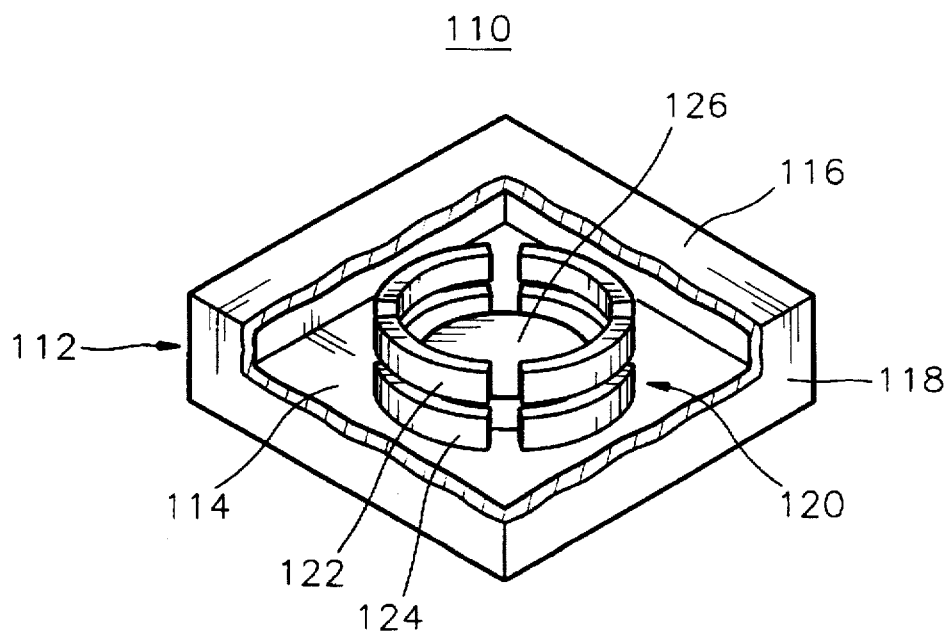
FIG. 3 is a partially cut away perspective view for showing the level determining section of FIG. 2.
Figure 4:
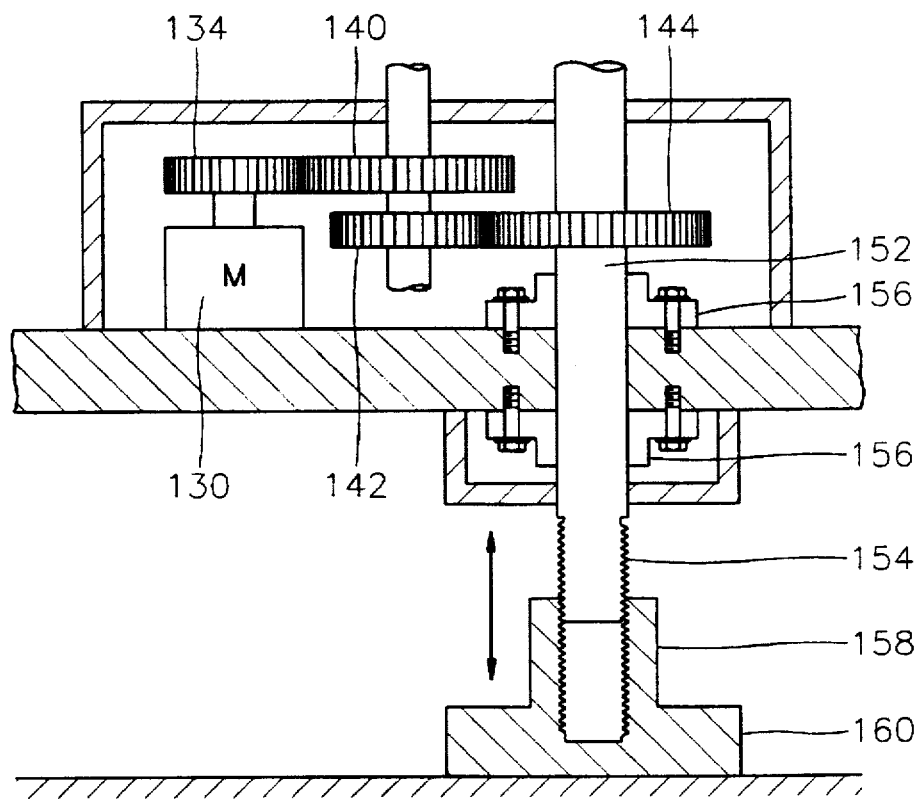
FIG. 4 is a perspective view for explaining the operations of a driving section and a levelling section of the levelling apparatus of FIG. 1.
Figure 5:
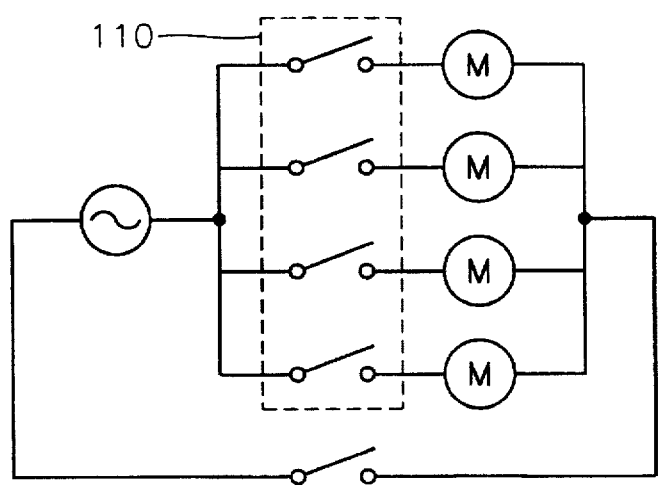
FIG. 5 is a perspective view for showing an electrical connection between the determining section and the driving section of FIG. 1.

FIG. 1 shows a refrigerator in which a levelling apparatus 100 according to a preferred embodiment of the present invention is installed. FIG. 2 is a cross sectional view for showing a level determining section of the levelling apparatus of FIG. 1. FIG. 3 is a partially cut away perspective view for showing the level determining section of FIG. 2. FIG. 4 is a perspective view for explaining the operations of a driving section and a levelling section of the levelling apparatus of FIG. 1. FIG. 5 is a perspective view for showing an electrical connection between the determining section and the driving section of FIG. 1. As shown in FIGS. 2 through 5, a levelling apparatus 100 of a refrigerator 10 according to the preferred embodiment of the present invention includes a determining section 110 which is mounted on an upper surface of a base plate of refrigerator 10, and which determines whether a refrigerator 10 is level, and which determines which direction refrigerator 10 is leaning towards, if is it is not level, four motors 130, each of which generates a driving force and is mounted on one of the corners of the base plate 20 and connected to determining section 110, and includes four levelling sections 150, each of which is driven by a motor 130 corresponding thereto.

As shown in FIG. 2, determining section 110 is mounted on the bottom or top surface of a cabinet of refrigerator 10, preferably on base plate 20, which is parallel to shelves of refrigerator 10, and determining section 110 determines whether a refrigerator 10 is level and, and determines which direction refrigerator 10 is leaning towards, if it is not level. Determining section 110, as shown in FIGS. 2 and 3, includes a housing 112 having an upper plate 116, a lower plate 114, and a plurality of side wails 118 connecting the upper and lower plates 116 and 114 to each other, and includes a switching device 120 which electrically connects the motor 130 to a power source (not shown).

Switching device 120 includes four upper terminals 122 which are fixed to a lower surface of upper plate 116 of housing 112, four lower terminals 124 which are fixed to an upper surface of lower plate 124 of housing 112 at locations corresponding to the locations of upper terminals 122, and includes a connecting member 126 which selectively connects one of the upper terminals 122 to one of the lower terminals 124 corresponding to the upper terminal 122, or connects two of the upper terminals 122 to two of the lower terminals 124 corresponding to the upper terminals 122, if refrigerator 10 is not level.

Each of upper and lower terminals 122 and 124, as shown in FIGS. 2 and 3, has an arc-like cross section, and is installed such that its outer surface is directed towards the corner of housing 112. Upper and lower terminals 122 and 124 are respectively spaced apart from the center of base plate 20 and each of them are separately disposed in different quadrants. Connecting member 126 has a cylindrical shape and slides on lower plate 114.

If refrigerator 10 leans towards one direction F, R, B, L, FL, FR, BR, or BL, connecting member 126 slides and moves towards the direction F, R, B, L, FL, FR, BR, or BL. Then, connecting member 126 selectively connects one of upper terminals 122 to one of lower terminals 124 corresponding to upper terminal 122, or connects two of upper terminals 122 to two of lower terminals 124 corresponding to upper terminals 122. Motor 130 is electrically connected to switching device 120 and thus generates a driving force, and a shaft 132 of motor 130 is inserted into a driving gear 134.

Since leveling sections 150, which are provided at the corners of base plate of base and are respectively connected to motors 130, are similar in their structures, so only one levelling sections 150 connected to motor corresponding thereto will be explained hereinafter, with reference to FIGS. 2 through 4.

Levelling section 150 includes a first reduction gear 140 which is linked to the driving gear 134 in order to reduce the rotating speed of the motor 130 to a predetermined rotating speed, includes a second reduction gear 142 which is mounted aligned with first reduction gear 140, and includes a driven gear 144 which is linked to second reduction gear 142.

The diameter of the base circle of first reduction gear 140 linked to driving gear 134 is larger than that of driving gear 134, and the diameter of the base circle of second reduction gear 140, which is mounted on the same shaft as first reduction gear 140, is smaller than that of first reduction gear 140.

Driven gear 144 is rotatably inserted into base plate 20, and is fixed to an adjustable shaft 152, in which a spiral groove is formed on the outer peripheral surface thereof at the lower portion thereof. Thus, adjustable shaft 152 is rotated by driven gear 144. Adjustable shaft 152 is rotatably mounted in base plate 20 by bearings 156 which are mounted to the upper and lower surfaces of base plate 20. Spiral groove portion 154 of adjustable shaft 152 is engaged with extending portion 158, which supports refrigerator 10. A tapped hole is formed with extending portion 158, and the lower end of extending portion 158 is formed with the upper portion of supporting members 160 which make contact with the supporting surface, while adjustable shaft 152 is rotating. Supporting member 160 does not rotate due to the friction against the supporting surface, and adjustable shaft 152 is rotated and threaded in the tapped hole of extending portion 158 of supporting member 60.

Hereinafter, the operation of the levelling apparatus 100 of the refrigerator 10 according to the preferred embodiment of the present invention will be explained.

If the supporting surface on which refrigerator 10 is positioned is not level such that refrigerator 10 leans, for example, toward the front, connecting member 126 of determining section 110 slides and moves towards the front F between upper and lower terminals 122 and 124. Then, connecting member 126 makes contact with both upper and lower terminals 122 and 124 in the front left quadrant and upper and lower terminals 122 and 124 in the front right quadrant. Thus, connecting member 126 makes contact with upper and lower terminals 120 and 124, and respectively electrically connects respective upper terminals 122 to lower terminals 124, thereby respectively causing respective motors 130 to operate.

As motors 130 in the front rotate, the rotating speed of motors 130 are reduced by gears 140, 142, 144, and 146 and the rotating forces of motors 130 are respectively transferred to adjustable shafts 152. Then, as spiral groove portion 154 of each of adjustable shafts 152 is rotated so that adjustable shaft 152 rises away from extending portion 158 of supporting member 160, the front portion of refrigerator 10 rises upwardly.

If adjustable shafts 152 rises, connecting member 126 breaks contact with upper and lower terminals 122 and 124 of the front right and left quadrant, and thus causing the operations of motors 130 to stop. Then, refrigerator 10 is levelled, and is supported by adjustable shafts 152 and supporting members 160.

On the other hand, for example, if refrigerator 10 leans toward the front left direction FL, connecting member 126 moves towards the front left FL and makes contact with upper and lower terminals 122 and 124 located in the front left quadrants FL. Then, motor 130, which is electrically connected to upper and lower terminals 122 and 124 in the front left quadrant FL, is operated, and adjustable shaft 152 in the front left FL corner is rotated by the driving force of motor 130, causing the front left portion of refrigerator to rise upwardly. Then, if refrigerator 10 is levelled, connecting member 126 breaks contact with upper and lower terminals 122 and 124, and thus the operation of motor 130 which is electrically connected to upper and lower terminals 122 and 124 stops. Thus, refrigerator 10 is levelled, and supporting member 160 keep supporting refrigerator 10 in a level position.

As described in the above embodiment, the structure of the levelling apparatus according to the present invention is simple. Further, the levelling of a refrigerator can be easily controlled, and thus preventing any injury to a human being.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. An apparatus for levelling a refrigerator comprising:

means for determining whether a refrigerator is in a level and, if not in a level, and which direction it leans towards, said determining means being mounted on an upper surface of a base plate of a refrigerator;

four motors respectively mounted on corners of the base plate and connected to said determining means, for generating a driving force; and four means for levelling the refrigerator, said levelling means respectively being mounted on the corners of the base plate, said levelling means respectively being driven by said motors, wherein said determining means comprises a housing having an upper plate, a lower plate, and a plurality of side walls connecting the upper and lower plates; and a switching device having four upper terminals fixed to a lower surface of the upper plate of the housing, four lower terminals fixed to an upper surface of the lower plate of the housing at locations corresponding to locations of upper terminals, a connecting member for selectively connecting one of the upper terminals to one of the lower terminals corresponding to the upper terminal, or two of the upper terminals to two of the lower terminals corresponding to the upper terminals, when the refrigerator is not in a level.

2. An apparatus for levelling a refrigerator according to claim 1, wherein the upper and lower terminals have an arc-like cross section.

3. An apparatus for levelling a refrigerator according to claim 1, wherein the connecting member is a cylinder.

4. An apparatus for levelling a refrigerator according to claim 1, wherein each of said levelling means comprises a driving gear into which a shaft of one of said motors is inserted; a first reduction gear linked to the driving gear for reducing the rotating speed of said motor to a predetermined rotating speed; a second reduction gear mounted so that it is aligned with the first reduction gear; a driven gear linked to the second reduction gear; an adjustable shaft rotatably inserted into the base plate, wherein a spiral groove is formed on a lower outer surface of the base plate, and the driven gear is inserted into and fixed to the adjustable shaft for transferring the driving force of said motor; and a supporting member for supporting the refrigerator wherein a spiral portion of the adjustable shaft is threaded into a tapped hole thereof.

5. An apparatus for levelling a refrigerator according to claim 4, wherein each of the adjustable shafts is rotatably mounted by at least two bearings, the bearings being mounted in the upper and lower plates.

6. An apparatus for levelling a refrigerator comprising:

means for determining whether a refrigerator is level and for determining which direction it is leaning towards if it is not level, said determining means comprising a housing having an upper plate, having a lower plate, and having a plurality of side walls connecting the upper and lower plates; and comprising a plurality of upper terminals fixed to a lower surface of the upper plate of the housing, the same plurality of lower terminals being fixed to an upper surface of the lower plate of the bearing housing at locations corresponding to locations of upper terminals, and a cylindrical connecting member for selectively connecting one of the upper terminals to one of the lower terminals corresponding to the upper terminal, or two of the upper terminals to two of the lower terminals corresponding to the upper terminals, when the refrigerator is not level;

a plurality of motors corresponding to the upper or lower terminals, said plurality of motors respectively being mounted on corners of the base plate and connected to said determining means, for generating a driving force; and a plurality of levelling means for levelling the refrigerator corresponding to the upper and lower terminals, said levelling means having a driving gear into which a shaft of one of said motors is inserted; first and second reduction gears linked to the driving gear and being aligned with each other, for reducing the rotating speed of said motor to a predetermined rotating speed and aligned with each other; a driven gear linked to the second reduction gear; an adjustable shaft rotatably inserted into the base plate by bearings mounted on upper and lower surfaces of the base plate, wherein a spiral groove is formed on a lower outer surface of the base plate, and the driven gear is inserted into and fixed to the adjustable shaft for transferring the driving force of said motor; and a supporting member for supporting the refrigerator, wherein a spiral portion of the adjustable shaft is threaded into a tapped hole thereof.

* * * * *